(12) United States Patent
Olien

(10) Patent No.: US 10,394,375 B2
(45) Date of Patent: *Aug. 27, 2019

(54) SYSTEMS AND METHODS FOR CONTROLLING MULTIPLE DISPLAYS OF A MOTOR VEHICLE

(71) Applicant: Immersion Corporation, San Jose, CA (US)

(72) Inventor: Neil Olien, Montreal (CA)

(73) Assignee: IMMERSION CORPORATION, San Jose, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,002

(22) Filed: Nov. 22, 2017

(65) Prior Publication Data

US 2018/0095590 A1    Apr. 5, 2018

Related U.S. Application Data

(63) Continuation of application No. 15/005,931, filed on Jan. 25, 2016, now Pat. No. 9,851,838, which is a
(Continued)

(51) Int. Cl.
*G06F 3/041* (2006.01)
*G06F 3/01* (2006.01)
(Continued)

(52) U.S. Cl.
CPC .......... *G06F 3/0416* (2013.01); *B60K 37/06* (2013.01); *B60W 50/16* (2013.01); *G06F 3/016* (2013.01);
(Continued)

(58) Field of Classification Search
CPC ........ G06F 3/016; G06F 3/041; G06F 3/0412; G06F 3/0484; G06F 3/04847;
(Continued)

(56) References Cited

U.S. PATENT DOCUMENTS 5,757,268 A    5/1998   Toffolo et al.
5,889,670 A    3/1999   Schuler et al.
(Continued)

FOREIGN PATENT DOCUMENTS

CN         101616213 A    12/2009
DE         10349673 A1    5/2005
(Continued)

OTHER PUBLICATIONS

Office Action dated Jun. 26, 2018 in corresponding Chinese Patent Application No. 201410858187.9.
(Continued)

*Primary Examiner* — Joe H Cheng
(74) *Attorney, Agent, or Firm* — Medler Ferro Woodhouse & Mills PLLC

(57) ABSTRACT

A method includes displaying information via a first display, displaying information via a second display, controlling the information displayed via the first display and the second display with a controller, and receiving a first input from a user through a user interface. The first input includes a command to change a setting of the first display or the second display and/or the information being displayed via the first display or the second display. The method also includes generating a first haptic effect to confirm receipt of the first input.

20 Claims, 4 Drawing Sheets

Related U.S. Application Data continuation of application No. 14/145,753, filed on Dec. 31, 2013, now Pat. No. 9,244,532.

(51) Int. Cl.
| | | |
|---|---|---|
| *B60W 50/16* | (2012.01) | |
| *G06F 3/0338* | (2013.01) | |
| *G06F 3/14* | (2006.01) | |
| *B60K 37/06* | (2006.01) | |
| *G01C 21/36* | (2006.01) | |

(52) U.S. Cl.
CPC ............ *G06F 3/0338* (2013.01); *G06F 3/041* (2013.01); *G06F 3/1423* (2013.01); *B60K 2350/102* (2013.01); *B60K 2350/104* (2013.01); *B60K 2350/1024* (2013.01); *B60K 2350/1028* (2013.01); *B60K 2350/1048* (2013.01); *B60K 2350/352* (2013.01); *G01C 21/3664* (2013.01); *G06F 2203/014* (2013.01); *G06F 2203/015* (2013.01)

(58) Field of Classification Search
CPC ..... G06F 3/0488; G06F 3/1423; B60K 37/06; G01C 21/3664
See application file for complete search history.

(56) References Cited

U.S. PATENT DOCUMENTS

| | | | |
|---|---|---|---|
| 6,154,201 A | 11/2000 | Levin et al. | |
| 6,577,928 B2 | 6/2003 | Obradovich | |
| 6,697,721 B2 | 2/2004 | Arlinsky | |
| 7,126,583 B1 | 10/2006 | Breed | |
| 7,148,875 B2 | 12/2006 | Rosenberg et al. | |
| 8,269,726 B2 | 9/2012 | Prados | |
| 8,797,153 B2 | 8/2014 | Vanhelle et al. | |
| 8,803,837 B2 | 8/2014 | Glynn et al. | |
| 2003/0025595 A1 | 2/2003 | Langberg | |
| 2003/0058216 A1 | 3/2003 | Lacroix et al. | |
| 2003/0058265 A1 | 3/2003 | Robinson et al. | |
| 2004/0117084 A1 | 6/2004 | Mercier et al. | |
| 2005/0219206 A1 | 10/2005 | Schena et al. | |
| 2007/0097091 A1 | 5/2007 | Ng et al. | |
| 2007/0145857 A1 | 6/2007 | Cranfill et al. | |
| 2008/0024440 A1 | 1/2008 | Olien | |
| 2008/0122799 A1 | 5/2008 | Pryor | |
| 2009/0027332 A1 | 1/2009 | Cieler et al. | |
| 2009/0096746 A1 | 4/2009 | Kruse et al. | |
| 2010/0149111 A1 | 6/2010 | Olien | |
| 2010/0156818 A1 | 6/2010 | Burrough et al. | |
| 2010/0231508 A1 | 9/2010 | Cruz-Hernandez et al. | |
| 2010/0231550 A1 | 9/2010 | Cruz-Hernandez et al. | |
| 2010/0250071 A1 | 9/2010 | Pala et al. | |
| 2011/0257973 A1 | 10/2011 | Chutorash et al. | |
| 2012/0262487 A1 | 10/2012 | Huebner | |
| 2013/0097557 A1* | 4/2013 | Madau | A61B 5/18 715/810 |
| 2013/0167077 A1 | 6/2013 | Nishihashi | |
| 2014/0002390 A1 | 1/2014 | Lee et al. | |
| 2014/0019913 A1 | 1/2014 | Newman et al. | |
| 2014/0092032 A1 | 4/2014 | Moore | |
| 2014/0129082 A1* | 5/2014 | Takahashi | B60R 1/12 701/36 |
| 2014/0160050 A1 | 6/2014 | Olien et al. | |
| 2014/0253302 A1 | 9/2014 | Levesque et al. | |
| 2015/0015479 A1* | 1/2015 | Cho | G06F 3/013 345/156 |
| 2015/0029013 A1* | 1/2015 | Osornio Lopez | B60K 35/00 340/438 |
| 2016/0341962 A1* | 11/2016 | Amaru | G02B 27/0149 |
| 2018/0096605 A1* | 4/2018 | Bai | G08G 1/166 |

FOREIGN PATENT DOCUMENTS

| | | |
|---|---|---|
| EP | 1228917 A1 | 8/2002 |
| EP | 2138928 A1 | 12/2009 |
| GB | 2419503 A1 | 4/2006 |
| JP | 2001-283683 A | 10/2001 |
| JP | 2010-012855 A | 1/2010 |
| JP | 2013-127687 A | 6/2013 |

OTHER PUBLICATIONS

Office Action dated Apr. 20, 2018 in corresponding Japanese Patent Application No. 2014-250569.
European Examination Report in corresponding European Patent Application No. 14200251.8, dated Nov. 11, 2016.
Extended European Search Report in corresponding European Patent Application No. 14200251.8, dated Apr. 30, 2015.
Poitschke, Tony et al., "Gaze-based Interaction on Multiple Displays in an Automotive Environment," 2011 IEEE International Conference on System, Man, and Cybernetics (Oct. 9, 2011).
European Search Report issued in European Application No. 18185082.7, dated Sep. 19, 2018.
Rejection Decision issued in Japanese Application No. 2014-250569, dated Mar. 18, 2019.

* cited by examiner

SYSTEMS AND METHODS FOR CONTROLLING MULTIPLE DISPLAYS OF A MOTOR VEHICLE

CROSS-REFERENCE TO RELATED APPLICATION

The present application is a continuation of prior U.S. patent application Ser. No. 15/005,931, filed Jan. 25, 2016 (now U.S. Pat. No. 9,851,838), which is a continuation of prior U.S. patent application Ser. No. 14/145,753, filed Dec. 31, 2013 (now U.S. Pat. No. 9,244,532), the disclosures of which are incorporated by reference herein in their entirety.

FIELD

The present invention is related to systems and methods for controlling multiple displays with a single controller and a haptic enabled user interface.

BACKGROUND

Many types of vehicles on the market today include multiple displays at different locations. For example, a display may be located at the center stack, another display may be located in the dashboard or instrument cluster, and a heads-up display (HUD) may be located so that an image is displayed on the windshield in the driver's peripheral vision. Currently, each of these displays has its own dedicated controller or no controller such that the display may only be turned on or off. Being able to control and interact with all of the displays with a single controller and a single user interface may increase usability of the displays while reducing cost and space, and may also allow for totally new graphic user interface (GUI) designs that use all of the different types of displays.

SUMMARY

It is desirable to have a single controller that can control all of the displays in a vehicle. It is also desirable to provide the driver of the vehicle with haptic feedback as the driver is manipulating the controller to switch active control between the different displays so that the driver does not have to take his or her eyes off of the road while providing input to the controller.

According to an aspect of the invention, there is provided a method that includes displaying information via a first display, displaying information via a second display, controlling the information displayed via the first display and the second display with a controller, receiving a first input from a user through a user interface, the input comprising a command to change a setting of the first display or the second display and/or the information being displayed via the first display or the second display, and generating a first haptic effect to confirm receipt of the first input.

In an embodiment, the method also includes receiving a second input from the user through a display control selector to select which of the first display and the second display is being controlled by the user, and associating the first input received from the user through the user interface with the first display or the second display selected by the user through the display selection device. In an embodiment, the method also includes changing the haptic effect based on the selection of which of the first display and the second display is being controlled by the user.

In an embodiment, the method also includes generating a second haptic effect at the user interface prior to receiving the first input, the second haptic effect providing an indication to the user which of the first display and the second display the first input will be directed to. In an embodiment, the first haptic effect is a vibrotactile effect and the second haptic effect is a friction effect.

According to an aspect of the invention, there is provided a system that includes a first display, a second display, and a controller in signal communication with the first display and the second display. The controller is configured to control output of the first display and the second display. The system also includes a user interface in signal communication with the controller. The user interface includes an input device configured to receive a first input from a user of the system and output a control command to the controller to change a setting and/or the output of the first display or the second display based on the first input, and a haptic output device configured to output a haptic effect to the user to confirm receipt of the first input to the user.

In an embodiment, the haptic output device includes an actuator, and the haptic effect includes vibrotactile feedback. In an embodiment, the actuator includes a piezoelectric actuator, a voice coil, a magnetic actuator, a pneumatic actuator, an ultrasonic energy actuator, an eccentric mass actuator, an electroactive polymer actuator, or a shape memory alloy.

In an embodiment, the system also includes a display control selector configured receive a second input from the user to select which of the first display and the second display is being controlled by the user. In an embodiment, the haptic output device is configured to change the haptic effect based on the determination of which of the first display and the second display is being controlled by the user.

In an embodiment, the first display includes a display screen and the second display comprises a display screen. In an embodiment, the first display is a heads-up display and the second display comprises a display screen.

In an embodiment, the input device includes a touch input device. In an embodiment, the haptic output device includes an electrostatic device, and the haptic effect comprises a friction effect. In an embodiment, the touch input device includes a touch pad. In an embodiment, the touch input device includes a touch screen.

In an embodiment, the input device includes a joystick. In an embodiment, the input device includes a rotary knob.

According to an aspect of the invention, there is provided a motor vehicle that includes embodiments of the system described herein.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
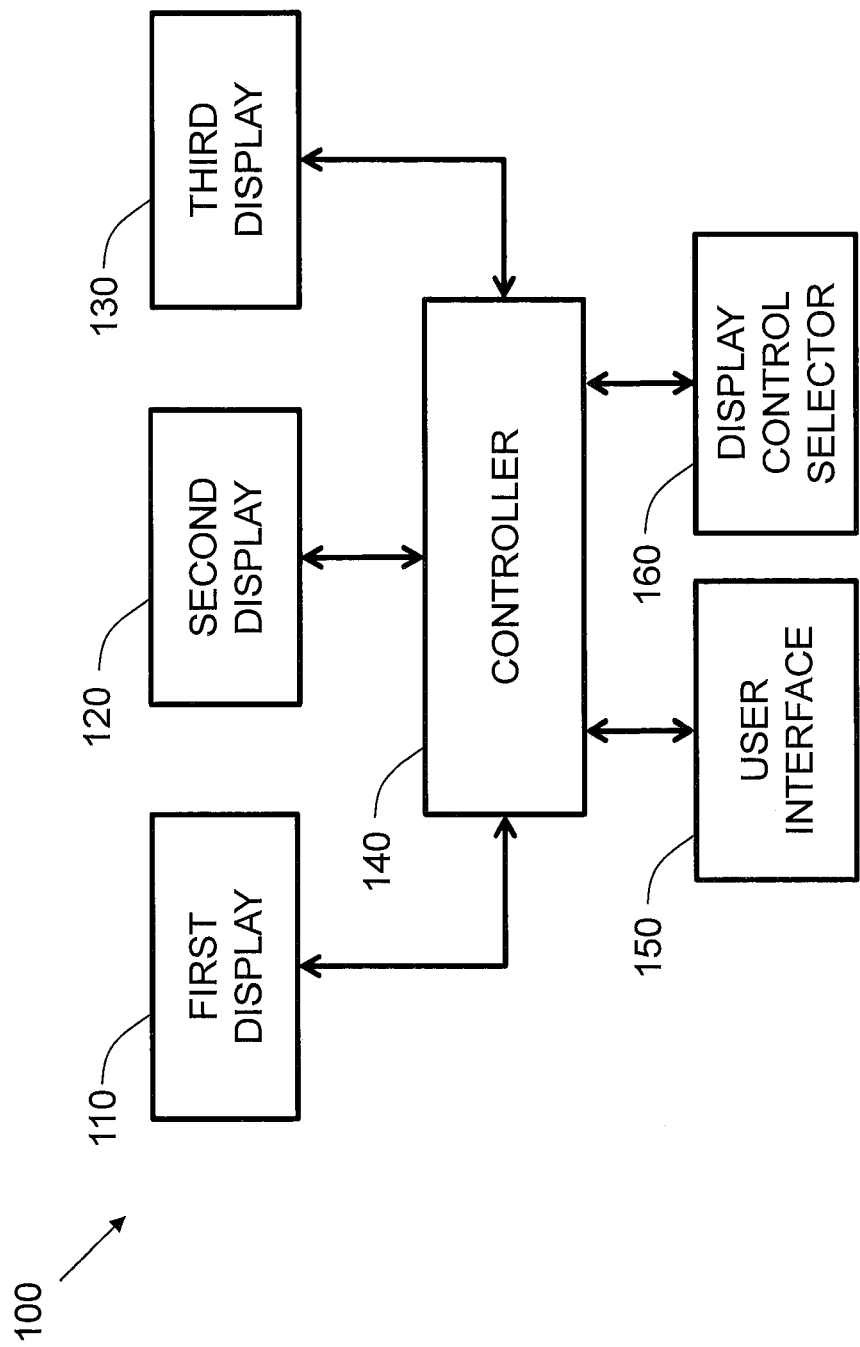
FIG. 1 schematically illustrates a system in accordance with embodiments of the invention.

FIG. 1 illustrates a system 100 in accordance with an embodiment of the invention. As illustrated, the system 100 includes a first display 110, a second display 120, and a third display 130, all of which are in signal communication with a single controller 140. The system 100 also includes a user interface 150 and a display control selector 160, each of which is in signal communication with the controller 140, as illustrated in FIG. 1. The system 100 may include more or less displays than the three displays 110, 120, 130 shown. For example, in an embodiment, the system 100 may only include two displays and in another embodiment, the system 100 may include more than three displays. The illustrated embodiment is not intended to be limiting in any way.

Figure 2:
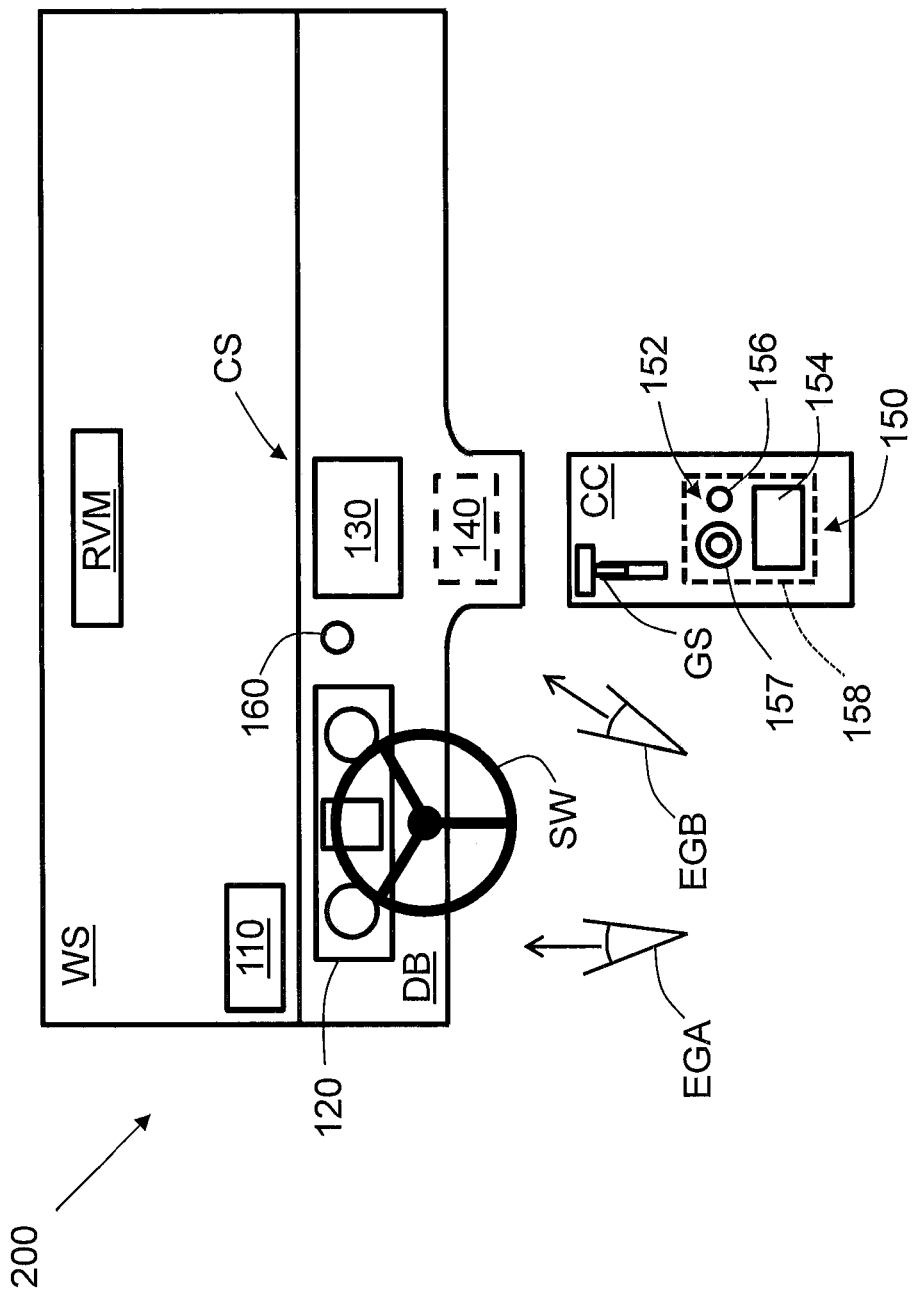
FIG. 2 schematically illustrates an interior of a vehicle that includes the system of FIG. 1.

FIG. 2 illustrates the system 100 of FIG. 1 in the context of a vehicle 200. As illustrated, the vehicle 200 includes a steering wheel SW that extends from a dashboard DB, a windshield WS that is located above the dashboard DB, a rearview mirror RVM positioned near a top and center of the windshield, a center stack CS in the center of the dashboard, a center console CC located between two front passenger seats (not shown), and a gear shift GS that extends from the center console CC. As also illustrated in FIG. 2, the first display 110 is a heads-up display that is configured to project images onto the windshield WS in a peripheral vision of a driver of the vehicle 200 when the driver is looking straight ahead through the windshield (WS). The second display 120 is an instrument panel located in the dashboard DB behind the steering wheel SW relative to the position of the driver. The second display 120 may be configured to display information with respect to the speed of the vehicle, an odometer, engine conditions of the vehicle, such as coolant temperature, fuel level, exterior environmental conditions, such as temperature, etc. The third display 130 is located in the center stack CS and may be configured to display maps as part of a global positioning system ("GPS"), as well as information with respect to a stereo system (not shown) in the vehicle, such as the radio station being listened to or song currently being played on the stereo system, etc. Other information with respect to the vehicle, such as temperature settings for the interior of the vehicle, etc., may also be displayed by the third display 130 in the center stack CS. Although the controller 140 is illustrated as being located in the center stack CS, the controller 140 may be located anywhere in the vehicle 200. The illustrated embodiment is not intended to be limiting in any way. Details of the controller 140 are described in further detail below.

As also illustrated in FIG. 2, the user interface 150 is located in the center console CC near the gear shift GS. The user interface 150 may be located in another location that is still convenient for the user to manipulate without having to be distracted from driving the vehicle 200. For example, the user interface 150 should be located at a position that is easy for the driver to reach without having to stretch. In an embodiment, the user interface 150 or a portion of the user interface 150 may be located on the steering wheel SW, the dash board DB, the center stack CS, the driver's door, the driver's seat, etc. The illustrated embodiment is not intended to be limiting in any way. The user interface 150 includes at least one user input device 152 and is discussed in further detail below.

Although the display control selector 160 is illustrated in FIG. 2 as being located in the dash board DB, the display control selector 160 may be located at any location within the vehicle 200 that allows the user to provide an input that sends a signal to the controller to signify which display the user would like to control through the user input device 152. For example, the display control selector 160 may be part of the user interface 150 located in the center console CC or may be located on the steering wheel SW. The illustrated embodiment is not intended to be limiting in any way.

In an embodiment, the display control selector 160 may be in the form of a mechanical button, rotary dial, slider switch, or any other physical element that the user may physical engage to change which of the displays 110, 120, 130 is being controlled via the user input device 152. In an embodiment, the display control selector 160 may be configured to receive voice commands from the user. For example, the display control selector 160 may include a microphone that receives a voice command from the user and communicates a voice command signal to a processor, which may be part of the controller 140. The voice command signal may be converted to a command for the controller 140 to communicate to one of the displays 110, 120, 130 and/or to the user interface 150. For example, the user may command the controller 140 to switch active control from one display to another display so that the user may use the user interface 150 to change a setting of one of the displays 110, 120, 130 that was not currently under active control.

In an embodiment, the display control selector 160 may be configured to detect an eye gaze of the driver of the vehicle 200 and may include any detection means that are used to detect eye gaze. For example, the display control selector 160 may include an eye gaze detector configured to detect an eye gaze of the may include a camera configured to capture an image of an eye of the driver of the vehicle 200 and a processor configured to determine the direction of the eye gaze based on the image captured by the camera. In an embodiment, the processor may be part of the controller 140. Image processing techniques to determine eye gaze direction and are well known in the literature and therefore are not described herein.

In an embodiment, the display control selector 160 may include a sensor that is configured to monitor movements of muscles near the eye of the driver of the vehicle 200 and a processor configured to determine the direction of the eye gaze based on the monitored movement. In an embodiment, the sensor may be configured to measure electrical activity of the muscles moving the eyes. In an embodiment, the processor may be part of the controller 140. In an embodiment, the driver's eye gaze direction may be estimated by analyzing the driver's body or head posture.

In an embodiment, the display control selector 160 may also be configured to determine where the driver's current eye gaze direction is focused, such as at the first display 110, as indicated by EGA, or at the third display 130, as indicated by EGB. This may be accomplished by using image processing .techniques to determine the position and the shape of the iris of a driver's eye, in combination with a model or stored reference image of the iris. In an embodiment, the driver's eye gaze direction may be stored as pitch and yaw angles for each eye. With this information, the depth of field of the driver's current gaze may also be determined. In an embodiment, other sensors may be used in addition to the display control selector 160 to better determine the driver's intent or volition, such as sensors that are typically associated with functional magnetic resonance imaging ("fMRI") or electro-encephalogram ("EEG").

Other smart context awareness solutions may allow the user interface 150 to control the desired display 110, 120, 130, as discussed in further detail below. The embodiments described herein should not be considered to be limiting in any way.

Figure 3:
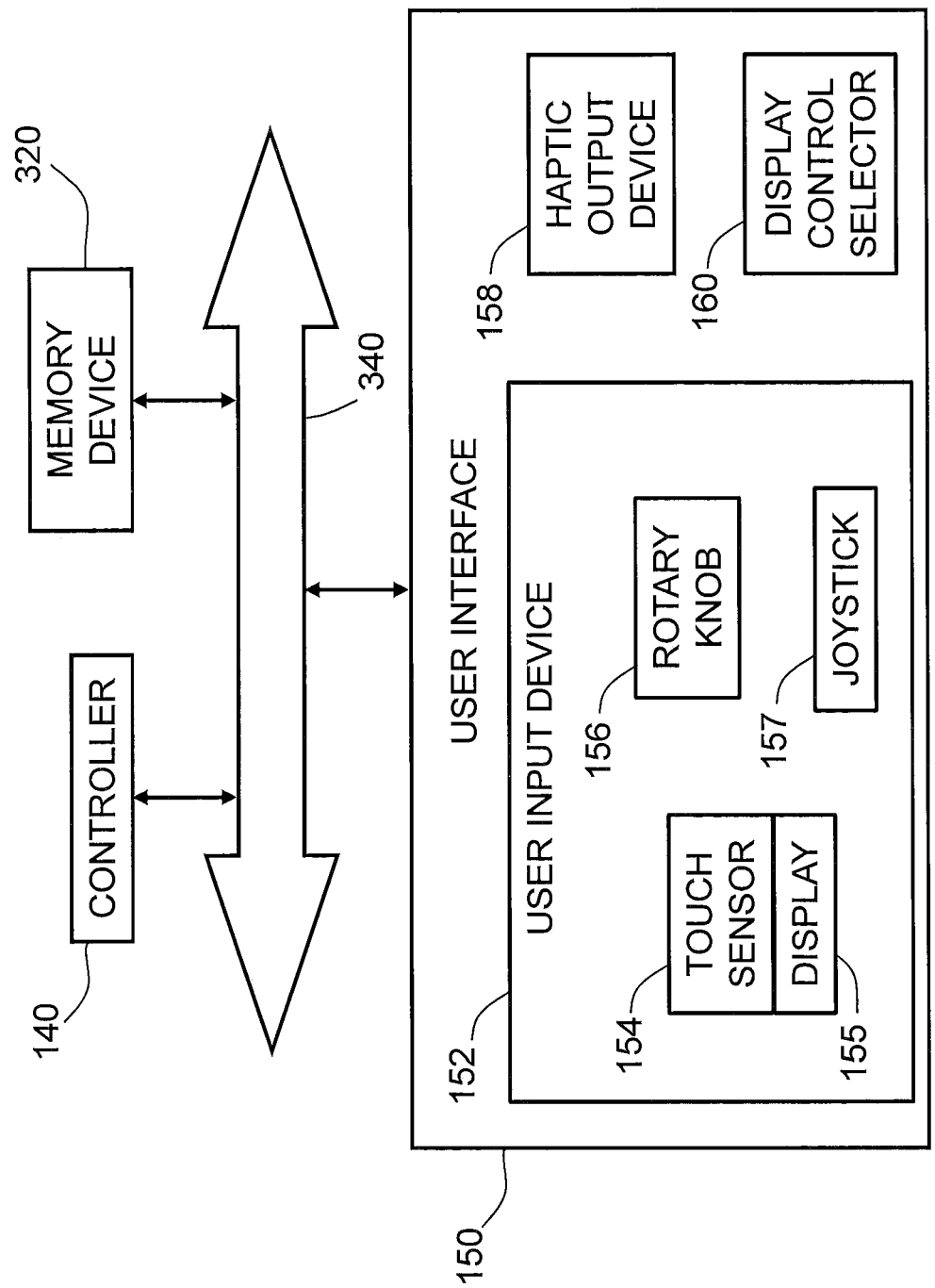
FIG. 3 schematically illustrates a portion of the system of FIG. 1 that includes a controller and a user interface.

FIG. 3 illustrates an embodiment of the user interface 150 in further detail. As illustrated, the user interface 150 may be interconnected to the controller 140 via a bus 310 such that the user interface 150 is in signal communication with the controller 140. The bus 310 may include wired communication links, wireless communication links, and/or other communication links between the controller 140 and the user interface 150. Signals may be output by the user interface 150 to the controller 140 and signals may be output by the controller 140 to the user interface 150. The user interface 150 includes at least one user input device 152 configured to receive an input from the user of the system 100. In an embodiment, the user input device 152 may be in the form of a touch pad that includes a touch sensor 154 configured to sense an input from the user. The touch sensor 154 may be configured to detect gestures from the user, such as tapping, sliding, rubbing, or pressing a surface of the touch sensor 154. Several technologies may be used for this purpose, such as capacitive or resistive sensing, force-sensitive resistors, or optical switches, for example. In an embodiment, the touch sensor 154 may be part of the display control selector 160 and specific gestures provided by the user to the touch sensor 154, such as a one-finger, two-finger, or three-finger swipe, depending on whether the first display 110, second display 120, or third display 130, respectively, is to be controlled.

In an embodiment, the user input device 152 may include a display 155 in combination with the touch sensor 154, such as in the form of a touch screen. In an embodiment, the user interface 150 may optionally include a display 155 that is configured to provide a visual signal to the user. In an embodiment, the touch sensor 154 and the display 155 may be combined into a touch screen. The user interface 150 may include an audio output device, such as a speaker, that is configured to provide audio feedback to the driver. The speaker may be part of the user interface 150 or part of the sound system of the vehicle 200.

In an embodiment, the user input device 152 may include a rotary knob 156 or a joystick 157 that may be manipulated by the user in order for the user to provide input to the system 100. Rotary knobs and joysticks are currently used as user input devices in a variety of vehicles and implementations of such devices are known to one of ordinary skill in the art. Therefore, details of such input devices are not provided herein.

The user interface 150 also includes a haptic output device 158 configured to provide a haptic effect or feedback to the user as confirmation that the input was received and/or to provide guidance to the user when performing a function with respect to one of the displays 110, 120, 130. The haptic feedback may be created with any method of creating a haptic effect, such as vibration, deformation, kinesthetic sensations, electrostatic or ultrasonic friction, etc. The haptic output device 158 may include one or more actuators, driving circuitry, and a haptic engine configured to generate driving signals for the actuator(s). The haptic output device 158 may use a variety of surface haptic technologies such as friction displays, vibrotactile actuators, and/or electrotactile arrays, etc.

For example, in an embodiment, the haptic output device 158 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 158 may include non-mechanical or non-vibratory devices such as those that use electrostatic friction ("ESF"), ultrasonic surface friction ("USF"), or those that induce acoustic radiation pressure with an ultrasonic haptic transducer, or those that use a haptic substrate and a flexible or deformable surface, or those that provide projected haptic output such as a puff of air using an air jet, and so on. Such implementations of haptic output devices are known to one of ordinary skill in the art and therefore are not discussed in further detail herein.

The haptic output device 156 may be integrated with the touch sensor 154 or be separate from the touch sensor 154. In an embodiment, the touch sensor 154 may also be configured to support the rendering of haptic effects by the haptic output device 158, such as the modulation of friction effects as a finger slides against the touch sensor 158. In an embodiment, multiple haptic output devices may be used to generate different haptic effects.

In an embodiment, the haptic output device 158 is configured to provide haptic feedback to the user of the system 100 while the user is in contact with a least a portion of the system 100. For example, the haptic output device 158 may provide haptic feedback to the user interface 150 itself to impose a haptic effect when the user is in contact with the user interface 150 and/or to another part of the system 100, such as the steering wheel SW and/or the driver's seat when the system 100 is implemented in the vehicle 200.

As illustrated in in FIG. 3, a memory device 320 may also be interconnected with the controller 140 and to the user interface 150 via the bus 310. The memory device 320 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage devices may include haptic effect profiles, instructions for how the haptic output device 158 of the user interface 150 is to be driven, or other information for generating haptic effects.

In addition to the user interface 150, the system 100 may also include additional input devices and output devices. For example, additional user input devices 152 may be located on the steering wheel SW, the dash board DB, the center stack CS, the center console CC, and/or a door or seat of the vehicle 200. Additional output devices, such as additional haptic output devices 158, may be provided in, for example, the steering wheel SW and/or driver's seat of the vehicle.

The controller 140 may be a general-purpose or specific-purpose processor or microcontroller for managing or controlling the operations and functions of the system 100. For example, the controller 140 may be specifically designed as an application-specific integrated circuit ("ASIC") to control output signals to the displays 110, 120, 130 to provide visual information and to the haptic output device 158 to provide haptic effects. The controller 140 may be configured to determine, based on predefined factors, the type(s) of haptic effect(s) to be generated, the order in which the haptic effects are generated, and the magnitude, frequency, duration, and/or other parameters of the haptic effects. The controller 140 may also be configured to provide streaming commands that can be used to drive the haptic output device 158 for providing a particular haptic effect. In some embodiments, the controller 140 may actually include a plurality of processors, each configured to perform certain functions within the system 100.

Figure 4:
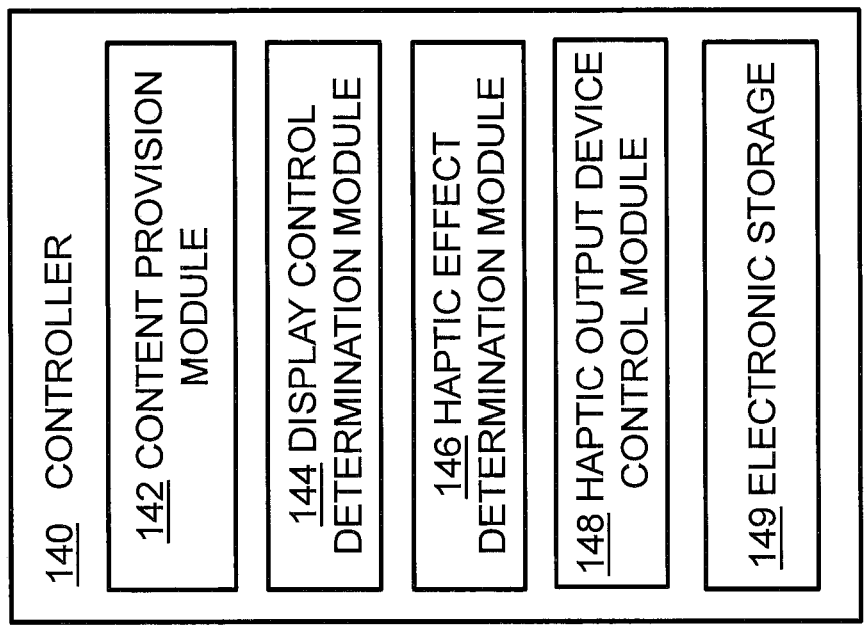
FIG. 4 schematically illustrates an embodiment of the controller of FIGS. 1-3.

FIG. 4 illustrates a more detailed view of an embodiment of the controller 140. The controller 140 may be configured to execute one or more computer program modules. The one or more computer program modules may include one or more of a content provision module 142, a display control determination module 144, a haptic effect determination module 146, a haptic output device control module 148, and/or other modules. The controller 140 may be configured to execute the modules 142, 144, 146, and/or 148 by software, hardware, firmware, some combination of software, hardware, and/or firmware, and/or other mechanisms for configuring processing capabilities on the controller 140.

It should be appreciated that although modules 142, 144, 146, and 148 are illustrated in FIG. 4 as being co-located within a single processing unit, in embodiments in which the controller 140 includes multiple processing units, one or more of modules 142, 144, 146, and/or 148 may be located remotely from the other modules. For example, the display control determination module 144 may reside in the processor of the display control selector 160 described above. The description of the functionality provided by the different modules 142, 144, 146, and/or 148 described below is for illustrative purposes, and is not intended to be limiting, as any of the modules 142, 144, 146, and/or 148 may provide more or less functionality than is described. For example, one or more of the modules 142, 144, 146, and/or 148 may be eliminated, and some or all of its functionality may be provided by other ones of the modules 142, 144, 146, and/or 148. As another example, the controller 140 may be configured to execute one or more additional modules that may perform some or all of the functionality attributed below to one of the modules 142, 144, 146, and/or 148.

The content provision module 142 is configured to control the provision of content to the user of the system 100 via the first display 110, the second display 120, and the third display 130. If the content includes computer generated images, the content provision module 142 is configured to generate the images and/or views for display to the user through the displays 110, 120, 130. The content, or information from which the content is derived, may be obtained by the content provision module 142 from an electronic storage 149, which may be part of the controller 140, as illustrated in FIG. 4, or may be separate from the controller 140, such as part of the memory device 320 illustrated in FIG. 3.

The display control determination module 144 is configured to determine which display the user is controlling or is about to control based on information from the output signals generated by the display control selector 160. For example, in an embodiment in which the display control selector 160 is an eye gaze detector, the information related to direction of the user's eye gaze determined by the display control determination module 144 may describe the direction as a vector in an absolute coordinate system, with respect to other objects, and/or in other contexts. Such information may include, without limitation, coordinates and/or angular relationships, such as pitch and yaw angles, as described above. If it is determined that the user is gazing in the direction of the second display 120, the display control determination module 144 may output a signal that switches the user input device 152 to control the second display 120 so that the next input by the user will be directed to the second display 120.

In an embodiment, the display control determination module 144 may use the output from the content provision module 142 in order to determine which display 110, 120, 130 the user is likely to direct the next input to based on the content of what is being displayed by the displays 110, 120, 130. For example, if the first display 110 is a heads up display that is displaying the next step in a currently selected navigation route as well as an alternative route, the display control determination module 144 may use the context of what is being displayed (i.e. a choice of two routes) to determine that the next input provided by the user through the user input device 152 is most likely intended for the first display 110 and output a signal that switches the user input device 152 to control the first display 110 so that the next input by the user will be directed to the first display 110.

The haptic effect determination module 146 is configured to determine the haptic effect or sensation to be generated by the haptic output device 158 and output to the user of the system 100. For example, the haptic effect may be based on information received from the display control selector 160 and any other sensor that is configured to determine the user's intent or volition, as described above, with respect to which of the displays 110, 120, 130 to control with the user input device 152. Determining the haptic effect may include determining the type of haptic effect and one or more parameters of the haptic effect, such as amplitude, frequency, duration, etc.

For example, one type of haptic effect that is determined by the haptic effect determination module 146 may provide the user with confirmation of an input provided by the user to the system 100. Such a haptic effect may be a vibrotactile effect that is generated with, for example, an actuator described above. Another type of haptic effect that is determined by the haptic effect determination module 146 may provide the user with information on which of the displays 110, 120, 130 is currently under active control by the controller 140 so that the user may change a setting of one of the displays 110, 120, 130 and or the information being displayed by one of the displays 110, 120, 130. Such a haptic effect may be a friction effect that is generated as the user slides a finger across a touch pad that includes the touch sensor 154 and the haptic output device 158.

In an embodiment, different haptic effect themes may be associated with the different displays 110, 120, 130 and designed to indicate or reinforce which of the displays 110, 120, 130 is currently being controlled by the user through the user input device 152. The haptic effect that is determined by the haptic effect determination module 146 may also assist the user with making adjustments to one or more settings associated with the information being displayed by one of the displays 110, 120, 130. For example, the haptic effect may increase in amplitude and/or frequency as the user is increasing a setting. Another type of haptic effect that is determined by the haptic effect determination module 146 may provide the user with confirmation that control of one of the displays 110, 120, 130 via the user input device 152 has been transitioned to another of the displays 110, 120, 130.

The haptic output device control module 148 is configured to control the haptic output device 158 to generate the haptic effect determined by haptic effect determination module 146. This includes communicating a haptic output signal generated by the controller 140 to the haptic output device 158 via the bus 310. In an embodiment, at least a portion of the functionality attributed to the haptic output device control module 148 may be disposed in a processor carried by the haptic output device 158.

In accordance with embodiments of the invention, the haptic effects that are output by the haptic output device 158 of the system 100 may be provided as confirmation that an input that was provided by the user to the user input device 152 has been received and an associated action will be implemented by the controller 140. Such a haptic effect may include a single pulse or series of pulses that is/are felt by the user as a vibration or vibrations.

In accordance with embodiments of the invention, the haptic effects that are output by the haptic output device 158 of the system 100 may include transitions as the user moves from one of the displays 110, 120, 130 to another display 110, 120, 130. For example, the controller 140 may be currently controlling the output of the third display 130 and any input provided by the user is directed to a setting or information being output by the third display 130. When the user decides to switch the control to another display, such as the second display 120, and indicates such a change with the display control selector 160, the haptic output device 158 may generate vibrations in the user's seat, for example, that may be used to play a transition effect so the user knows he or she is now controlling the second display 120 with the user input device 152.

In accordance with embodiments of the invention, the haptic effects that are output by the haptic output device 158 at the user input device 152 may be associated with a theme for one of the displays 110, 120, 130 to give the user confidence that he or she is now controlling the display that is intended to be controlled. For example, if the user is currently controlling the third display 130 with the user input device 152 and then indicates via the display control selector 160 that he or she would like to control the second display 120 instead, the haptic effects that are output by the haptic output device 158 may be distinctly different when the control is switched to the second display 120 so that the user knows that control was successfully switched and he or she is now controlling the second display 120. If for some reason the display control selector 160 did not receive the user's input to change control from the third display 130 to the second display 120 or does not communicate to the controller 140 that the user has indicated his or her desire to control the second display 120 instead of the third display 130, the haptic output device 158 may continue to output haptic effects that are associated with a theme for the third display 130 so that the user will know he or she is still controlling the third display 130.

In an embodiment, the system 100 may include one main display and a secondary display that is used less than the main display. The system 100 may be configured so that when the user has transitioned to the secondary display, a background vibration may be played on the user input device 152, such as a touch pad that is integrated with the haptic output device 158, to inform the user that the user is now providing input for the secondary display. When the user returns to the touch pad later and no longer feels the background vibration, he or she would immediately know that he or she has returned to controlling the main display with the user input device 152.

Other implementations, features and advantages of such implementations of the invention will be apparent to one of ordinary skill in the art upon reading and understanding the general principles of the present disclosure. These other implementations, features and advantages are intended to be included in the present disclosure as well.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A method performed by a controller for controlling at least a first display and a second display of a motor vehicle, the method comprising:
receiving a first input from a user input device of a user interface, the first input comprising a command to change at least one of a display setting or information being displayed;
determining, before the first input, which display of the first display and the second display is selected to be controlled by the user input device of the user interface;
controlling, with the first input, the at least one of the display setting or the information on the display that was selected from among the first display and the second display; and
causing a haptic output device in signal communication with the controller to generate a haptic effect based on which display of the first display and the second display was selected to be controlled by the user input device of the user interface.

2. The method of claim 1, wherein the user input device of the user interface includes at least one of a touch pad and a touch screen, and wherein the determining of which display of the first display and the second display is selected to be controlled by the user input device is based on an additional input from the user input device, the additional input being received before the first input.

3. The method of claim 2, wherein the determining of which display of the first display and the second display is selected to be controlled by the user input device is based on which touch gesture from among a one-finger gesture, two-finger gesture, and three-finger gesture is received at the at least one of the touch pad and touch screen.

4. The method of claim 2, wherein the haptic output device is disposed at the user interface, and wherein the haptic effect is generated at the user interface while there is user contact with the user interface.

5. The method of claim 1, wherein the haptic effect is generated at at least one of a steering wheel and a seat of the motor vehicle.

6. The method of claim 1, wherein a frequency or amplitude of the haptic effect is based on which display of the first display and the second display was selected to be controlled by the user input device of the user interface.

7. The method of claim 1, wherein a type or duration of the haptic effect is based on which display of the first display and the second display was selected to be controlled by the user input device of the user interface.

8. The method of claim 1, the method further comprising causing the haptic output device to generate an additional haptic effect to confirm receipt of the first input, wherein the haptic effect is a first type of haptic effect, and the additional haptic effect is a second type of haptic effect different than the first type.

9. The method of claim 8, further comprising changing the additional haptic effect based on which display of the first display and the second display was selected to be controlled by the user input device.

10. The method of claim 9, wherein the first type of haptic effect is an electrostatic haptic effect, and the second type of haptic effect is a vibrotactile haptic effect.

11. A system for a motor vehicle comprising:
a first display;
a second display;
a haptic output device;
a controller in signal communication with the first display, the second display, and the haptic output device, the controller being configured to control an output of the first display and an output of the second display; and
a user interface in signal communication with the controller and having a user input device configured to receive a first input that comprises a command to change at least one of a display setting or a display output,
wherein the controller is configured
to determine, before the first input, which display of the first display and the second display is selected to be controlled by the user input device of the user interface,
to control, with the first input, the at least one of the display setting or the display output on the display that was selected from among the first display and the second display, and
to cause the haptic output device to generate a haptic effect based on which display of the first display and the second display was selected to be controlled by the user interface.

12. The system of claim 11, wherein the first display comprises a display screen that is located on one of a dashboard and a center stack of the motor vehicle, and the second display comprises a display screen that is located on the other of the dashboard and the center stack of the motor vehicle.

13. The system of claim 12, wherein the second display is a heads-up display that is configured to project an image onto a windshield of the motor vehicle.

14. The system of claim 11, wherein the user input device of the user interface includes at least one of a touch pad and a touch screen, and wherein the controller is configured to determine which display of the first display and the second display is selected to be controlled by the user input device based on an additional input from the user input device, the additional input being received before the first input.

15. The system of claim 14, wherein the controller is configured to determine which display of the first display and the second display is selected to be controlled by the user input device based on which touch gesture from among a one-finger gesture, two-finger gesture, and three-finger gesture is received at the user input device.

16. The system of claim 11, wherein the haptic output device is disposed at the user interface, and wherein the controller is configured to cause the haptic effect to be generated at the user interface while there is user contact with the user interface.

17. The system of claim 11, wherein the controller is configured to cause a frequency or amplitude of the haptic effect to be based on which display of the first display and the second display was selected to be controlled by the user input device of the user interface.

18. The system of claim 11, wherein the controller is configured to cause a type or duration of the haptic effect to be based on which display of the first display and the second display was selected to be controlled by the user input device of the user interface.

19. The system of claim 11, wherein the controller is configured to cause the haptic output device to generate an additional haptic effect to confirm receipt of the first input, wherein the haptic effect is a first type of haptic effect, and the additional haptic effect is a second type of haptic effect different than the first type.

20. The system of claim 19, wherein the controller is further configured to change the additional haptic effect based on which display of the first display and the second display was selected to be controlled by the user input device.

* * * * *